May 18, 1965 J. A. O'CONNELL, JR 3,184,635

ELECTROLUMINESCENT DISPLAY DEVICE

Filed July 24, 1961 2 Sheets-Sheet 1

INVENTOR.
JAMES A. O'CONNELL, JR
BY
R. J. Frank
ATTORNEY

ELECTROLUMINESCENT DISPLAY DEVICE

Filed July 24, 1961 2 Sheets-Sheet 2

INVENTOR.
JAMES A. O'CONNELL, JR.
BY
R. J. Frank
ATTORNEY

United States Patent Office 3,184,635
Patented May 18, 1965

3,184,635

ELECTROLUMINESCENT DISPLAY DEVICE

James A. O'Connell, Jr., Syosset, N.Y., assignor to General Telephone and Electronics Laboratories, Inc., a corporation of Delaware Filed July 24, 1961, Ser. No. 126,014
11 Claims. (Cl. 315—71)

This invention is related to electroluminescent image display devices.

One type of electroluminescent display device, known as a crossed-grid electroluminescent panel, comprises a first array of discretely spaced horizontal rows of conductors, a second array of discretely spaced vertical rows of conductors and an electroluminescent layer interposed between the first and second arrays of conductors. When a suitable voltage is applied between any one horizontal conductor and any one vertical conductor, the portion of the electroluminescent layer (known as a cell) which lies between the energized conductors emits light.

The applied voltages can be switched or commutated in such manner as to successively energize each cell in turn, thus producing an effect analogous to cathode ray tube "scanning." Under certain circumstances, however, electroluminescent panels of this type will produce spurious luminous effects. For example, when a positive potential +V is applied to a selected horizontal conductor and a negative potential —V is applied to a selected vertical conductor (all other conductors being held at zero), a voltage difference of 2 v. is established between between the two selected conductors, and the electroluminescent cell connected between these two conductors luminesces brightly. At the same time, however, a potential difference of magnitude V is established between the selected conductor of each array and the unselected conductors of the other array, and the cells connected between these conductors luminesce dimly producing a spurious luminescent pattern.

This spurious luminescent pattern may be eliminated by interposing a layer of electrically non-linear material between the electroluminescent layer and one of the arrays of conductors in the manner described in copending patent application Serial No. 10,728, filed February 24, 1960, by M. Wasserman (now Patent 3,059,132 issued October 16, 1962). While devices of this type are suitable for many applications, it has been found that the resistive and capacitive coupling which exists between adjacent rows of conductors tends to reduce the efficiency of the electroluminescent panel.

Accordingly, it is an object of this invention to provide a new and improved electroluminescent panel in which spurious luminescent effects and electrical coupling between electroluminescent cells are minimized.

Another object is to provide an electroluminescent panel in which capacitive and resistive coupling between adjacent rows of electroluminescent cells is reduced to a minimum.

Still another object is to provide an electroluminescent panel in which spurious luminescence is suppressed by the use of discrete pillars composed of non-linear resistive material.

Yet another object is to provide a method of applying a plurality of discrete non-linear resistive pillars to a substrate.

A further object is to provide a method of applying electrically non-linear resistive pillars to substrates of varying sizes.

In accordance with the principles of my invention, I employ a crossed-grid structure provided with a first array of discretely spaced, horizontal rows of parallel, separated electrical conductors extending along a first direction and a second array of discretely spaced, vertical rows of parallel, separated electrical conductors extending along a second direction. A continuous electroluminescent layer is interposed between these arrays, the portions of the electroluminescent layer located between conductors of the first array and conductors of the second array being defined as cells. An impedance matching film is affixed to the electroluminescent layer, this film being composed of a plurality of separate conductive squares electrically insulated from each other. These squares or intermediate electrodes are arranged so that one is positioned between the electroluminescent layer and the second array of conductors at each point at which a first array conductor crosses over a second array conductor.

A pillar of non-linear resistive material is interposed between each intermediate electrode and a corresponding vertical conductor of the second array. The non-linear resistive material employed in the pillars is of the type wherein the impedance decreases as the voltage applied across it increases. Stated another way, the current through the element varies according to the equation $I=KV^n$, where I is the current through the non-linear resistive material, V is the voltage across it, K is a constant, and $n$ is a number greater than 1. The pillars are symmetrically conductive, i.e. reversing the polarity of the voltage impressed across a pillar reverses the direction of the current through it, but does not alter the magnitude of the current.

Each of the pillars is composed of a core of non-linear resistive material circumferentially surrounded by an electrically insulating coating. The pillars are formed by thoroughly mixing a non-linear resistive powder with an epoxy resin and then stencilling the mixture through a mask on to the intermediate electrodes. A typical mixture consists of silicon carbide, 60–65% polybisphenol type A epoxy resin, 10–13% polyamide liquid (catalyst) and 2–3 drops of silicone resin, the amounts of polybisphenol A resin and polyamide being expressed as percentages by weight of silicon carbide. The small amount of silicone resin acts as a flow control agent to prevent the formation of bubbles. As the mixture hardens, surface tension causes the epoxy resin to circumferentially form around a core of non-linear resistive powder, the non-linear resistive powder being concentrated largely at the center of the pillar. The resin coating provides a high impedance electrical path around the periphery of the pillar where the distance between the vertical conductor and the electroluminescent layer is a minimum. In this way, the effective impedance of the pillars is maintained at a uniform value over the entire area contacted by the vertical conductor.

When an alternating voltage is applied between a selected horizontal conductor and a selected vertical conductor, the corresponding electroluminescent cell luminesces to a degree dependent upon the magnitude of the voltage. Due to the properties of the non-linear resistive pillar and the impedance matching film, no spurious luminescent pattern is produced, the illumination from the selected electroluminescent cell being displayed against an essentially dark background.

The electroluminescent cell acts electrically as a lossy luminous capacitor while each non-linear resistive pillar acts electrically as a discrete non-linear resistor shunted by a capacitor. Thus, each horizontal conductor is connected to each vertical conductor through a series circuit consisting of the electroluminescent capacitor and the non-linear resistor. When full excitation voltage is applied between selected horizontal and vertical conductors, the impedance of the pillar interposed between them is low relative to that of the cell and a large portion of the applied voltage appears across the electroluminescent cell causing it to emit light. On the other hand, when 50% or less of the full excitation voltage appears between the conductors, the pillar acts essentially as a pure capacitance. The relative values of the pillar capacitance and the cell capacitance are such that only a small proportion of the entire voltage drop appears across the electroluminescent cell and spurious light signals are not produced.

Since each row of pillars is electrically isolated from the adjacent rows, capacitive and resistive coupling between adjacent rows of conductors is almost entirely eliminated. Thus, undesired cross-coupling, as well as spurious luminescence is minimized.

In order to simplify the application of the second array conductors to the non-linear resistive pillars the spaces between the pillars may be filled with a plastic layer. This results in a device in which adjacent rows of pillars are electrically isolated from each other and in which the plastic between the pillars provides additional support for the first array conductors. Alternatively, the pillar structure can be designed to provide a graded contour between the pillars.

The above objects of and the brief introduction to the present invention will be more fully understood and further objects and advantages will become apparent from a study of the following description in connection with the drawings, wherein:

FIG. 1*a* is a perspective view of one embodiment of my invention;

FIGS. 1*b* and 1*c* are cross-sectional views of portions of FIG. 1*a* of the device;

The *a* part of FIG. 2 and the *b* part of FIG. 2 are top and cross-section views respectively of a pillar structure having a high concentration of non-linear resistive material;

The *a* part of FIG. 3 and the *b* part of FIG. 3 are top and cross-sectional views respectively of a pillar structure having a relatively low concentration of non-linear resistive material;

Figure 1A:
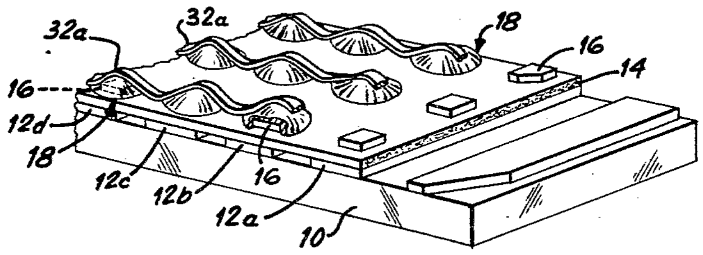
Figure 1B:
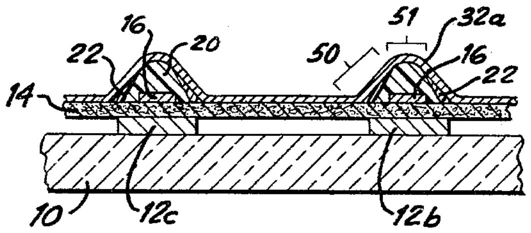
Figure 1C:
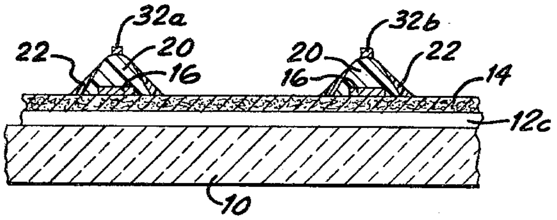

Referring to FIGS. 1*a*, 1*b* and 1*c*, there is shown a glass substrate, one surface of which is coated with a plurality of horizontal transparent conductors 12*a*–12*d*. An electroluminescent layer 14 is applied over the horizontal conductors. An impedance matching film is applied over the electroluminescent layer, this film comprising a plurality of electrically conductive squares 16 (termed intermediate electrodes) arranged in rows and columns, each row being in registration with a corresponding horizontal conductor 12*a*–12*d*.

A mixture of a non-linear resistive powder and an epoxy resin is next stencilled over the intermediate electrodes 16 to form a plurality of electrically isolated pillars 18. A typical mixture is composed of 8–10 grams of silicon carbide 600 grit powder, 5.0 grams of polybisphenol type A epoxy resin having a viscosity of between 40–100 poises (Epon 820 epoxy resin manufactured by Shell Chemical Co. is suitable for this purpose), 1.0–1.05 grams polyamide liquid catalyst, such as Shell Chemical Epon Curing Agent T–1, and 2 drops of a silicone resin, such as General Electric SR–82. This mixture can be used to treat a display panel having an area of about 9 square inches. In addition to silicon-carbide, other non-linear resistive materials such as cadmium sulphide, cadmium selenide, zinc oxide and gallium phosphide may be employed. As previously explained, the pillars are symmetrically conductive, the magnitude of the current through them being independent of the polarity of the applied voltage.

Figure 2:
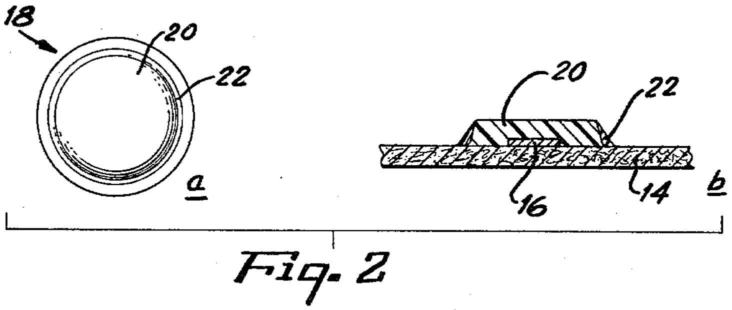

The electrical properties of the pillars can be controlled by varying the composition of the mixture and the height of the pillars, the height of the pillars being determined by the thickness of the stencil. In particular, increasing the concentration of the non-linear resistive powder or decreasing the height of the pillar increases the current density for a given applied voltage. The *a* and *b* parts of FIG. 2 are top and cross-section views respectively of a pillar 18 in which the concentration of a silicon carbide is about 35% by volume. As shown, the non-linear resistive silicon carbide powder 20 forms a central core while an insulating fillet 22 of epoxy resin forms circumferentially around the core 18. This distribution of the resin around the resistive core is believed to result from the effects of surface tension as the silicon carbide settles during hardening of the mixture.

Figure 3:
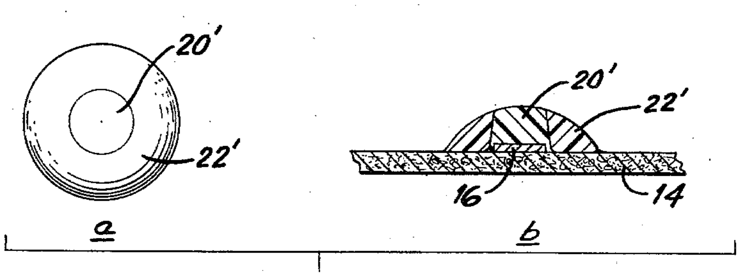

The *a* and *b* parts of FIG. 3 show top and side views respectively of a pillar in which the concentration of silicon carbide results in a non-linear resistive core 20′ of smaller area with a correspondingly larger area of resin 22′. Consequently, the current density for a given applied voltage is lower than that obtained with the higher concentration of silicon carbide used in the pillar of the *a* and *b* parts of FIG. 2.

Referring again to FIG. 1*a*, an array of vertical conductors 32*a*–32*c* are applied by vacuum deposition over the pillars 18. The impedance presented by the non-linear resistive pillars between each of the conductors 32*a*–32*c* and the corresponding intermediate electrodes is essentially uniform since the fillet 22 insulates the vertical electrodes from the resistive core at the periphery of the pillar. This is shown in FIG. 1*b* which is a cross-sectional view of the pillars subtended between vertical conductor 32*a* and horizontal conductors 12*b* and 12*c*. As illustrated, in the region 50 the distance between the conductor 32*a* and intermediate electrode 16 is less than the distance between conductor 32*a* and electrode 16 in the region 51. The epoxy fillet 22 concentrates the current flow between conductor 32*a* and electrode 16 in the region 51 and prevents a low impedance path from existing in the region 50 where the interelectrode spacing is diminished.

When an alternating voltage is applied between a particular horizontal electrode (for example 12*c*) and a particular vertical electrode (32*a*), the section of the electroluminescent layer 14 subtended between these electrodes is energized. Since the voltage is relatively high, the resistance of the pillar 18 is low and light is emitted by the portion of the electroluminescent layer between electrodes 12*c* and 32*a*. The light emitted can be seen through the transparent electrode 12*c* and the glass substrate 10. The resistance of the pillars subtended between all of the electrodes except 12*c* and 32*a* is so high that the adjacent electroluminescent cells do not luminesce and spurious patterns are eliminated. Since the pillars 18 are separated from each other, they do not provide a path for capacitive or resistive coupling to exist between each row of vertical conductors 32*a*–32*c* and the intermediate electrode associated with the adjacent rows.

In a typical device, the horizontal and vertical conductors can be formed of tin oxide and the intermediate electrodes of tin oxide or an opaque metal such as gold. The electroluminescent layer 14 can be formed of electroluminescent zinc sulphide particles embedded in a glass enamel. Typically, the thickness of the electroluminescent layer is about 0.002 inch, the width of the horizontal conductor about 0.125 inch, and the ratio of the width of the vertical conductor to the width of the intermediate electrodes is within the range 0.125 to 0.250. The overall diameter of the pillars 18 is about 0.135 inch and their height 0.012 inch.

Figure 4:
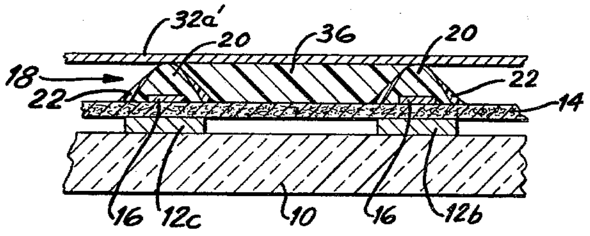
FIG. 4 is a cross-sectional view of a second embodiment of the invention.

FIG. 4 is a cross-sectional view of an embodiment of the invention in which an insulating plastic layer 36 is deposited over the electroluminescent layer 14 in the space between pillars 18. Layer 36 may be composed of a vinyl chloride acetate, such as Bakelite VMCH manufactured by the Union Carbide Corporation. The plastic layer 36 provides support for the array of vertical conductors (only conductor 32*a′* is illustrated) by equalizing the heights of the pillars and maintaining the distance between the vertical conductors and the electroluminscent layer constant.

Figure 5:
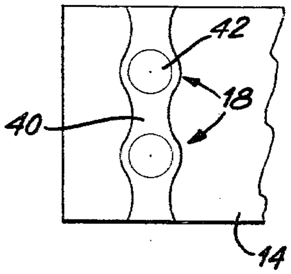
FIG. 5 is a top view of still another embodiment of the invention.

FIG. 5 is a plan view of another form of the invention in which the mixture of non-linear resistive powder and epoxy resin is applied through a mask arranged to form a graded insulating bridge 40 between pillars 18. Due to surface tension, the powder 42 is concentrated at the center of the pillar 18 while the epoxy resin spreads out facing the bridge 40 between the pillars. With this construction, the plastic layer 36 may be omitted while the variation in distance between conductors 32*a*–32*c* and electroluminescent layer 14 is substantially less than in the embodiment of FIGS. 1*a* and 1*b*, a condition which is desirable in many applications.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An electroluminescent device comprising a first array of parallel separated electrical conductors extending along a first direction; a second array of parallel separated electrical conductors extending along a second direction, a plane passed through said first array of parallel conductors being substantially parallel to a plane passed through said second array of parallel conductors: an electroluminescent layer interposed between said arrays; and a plurality of discrete spaced pillars interposed between one of said arrays and said electroluminescent layer, each of said pillars being composed of a symmetrically non-linear resistive core circumferentially surrounded by an electrically insulating coating.

2. An electroluminescent device comprising a first array of parallel separated electrical conductors extending along a first direction; a second array of parallel separated electrical conductors extending along a second direction, a plane passed through said first array of parallel conductors being substantially parallel to a plane passed through said second array of parallel conductors; an electroluminescent layer interposed between said arrays; and a plurality of discrete spaced pillars interposed between one of said arrays and said electroluminescent layer, each of said pillars being composed of a core consisting of silicon carbide surrounded by an electrically insulating epoxy resin coating.

3. An electroluminescent device comprising a first array of parallel separated electrical conductors extending along a first direction; a second array of parallel separated electrical conductors extending along a second direction, said second array of conductors crossing over said first array of conductors, a plane passed through said first array of parallel conductors being substantially parallel to a plane passed through said second array of parallel conductors; an electroluminescent layer interposed between said arrays; a plurality of spaced pillars having a symmetrical non-linear resistive characteristic interposed between one of said arrays and said electroluminescent layers, said pillars being located at the points where said second array of conductors cross over said first array of conductors; and a plurality of intermediate electrodes interposed between each of said pillars and said electroluminescent layer.

4. In an electroluminescent device, a non-linear resistive pillar consisting of a mixture of silicon carbide, 60–65% polybisphenol type A epoxy resin having a viscosity of between 40–100 poises, and 10–13% polyamide catalyst, said amounts of polybisphenol A and polyamide being expressed as percentages by weight of silicon carbide, said silicone carbide being concentrated at the center of said pillar.

5. An electroluminescent device comprising a first electrical conductor extending along a first direction; a second electrical conductor extending along a second direction, a plane passed through said first conductor being substantially parallel to a plane passed through said second conductor; an electroluminescent cell interposed between said first and second conductors, and a pillar having a symmetrical non-linear resistive characteristic interposed between said electroluminescent cell and said first electrical conductor, said pillar being composed of a non-linear resistive core circumferentially surrounded by an electrically insulating coating.

6. An electroluminescent device comprising a first array of parallel separated electrical conductors extending along a first direction; a second array of parallel separated electrical conductors extending along a second direction, a plane passed through said first array of parallel conductors being substantially parallel to a plane passed through said second array of parallel conductors; an electroluminescent layer interposed between said arrays; a plurality of discrete spaced pillars interposed between one of said arrays and said electroluminescent layer, each of said pillars having a symmetrically non-linear resistance characteristic; and a plastic film located on the surface of said electroluminescent layer in the space between said plurality of pillars.

7. An electroluminescent device comprising a first array of parallel separated electrical conductors extending along a first direction; a second array of parallel separated electrical conductors extending along a second direction, said second array of conductors crossing over said first array of conductors, a plane passed through said first array of parallel conductors being substantially parallel to a plane passed through said second array of parallel conductors; an electroluminescent layer interposed between said arrays, and a plurality of pillars interposed between said first array of conductors and said electroluminescent layer, said pillars being located at the points where said second array of conductors cross over said first array of conductors; each of said pillars being comprised of a symmetrically non-linear resistive core circumferentially surrounded by an electrically insulating coating.

8. An electroluminescent device comprising a first array of parallel separated electrical conductors extending along a first direction; a second array of parallel separated electrical conductors extending along a second direction, said second array of conductors crossing over said first array of conductors, a plane passed through said first array of parallel conductors being substantially parallel to a plane passed through said second array of parallel conductors; an electroluminescent layer interposed between said arrays; and a plurality of pillars interposed between said first array of conductors and said electroluminescent layer, said pilars being located at the points where said second array of conductors cross over said first array of conductors; each of said pillars being composed of a symmetrically non-linear resistive core circumferentially surrounded by an electrically insulating coating, the insulating coating on each of said pillars extending in said first direction and contacting the insulating coating of the adjacent pillar.

9. An electroluminescent device comprising a first array of parallel separated electrical conductors extending along a first direction; a second array of parallel separated electrical conductors extending along a second direction, said second array of conductors crossing over said first array of conductors, a plane passed through said first array of parallel conductors being substantially parallel to a plane passed through said second array of parallel conductors; an electroluminescent layer interposed between said arrays, and a plurality of pillars interposed between said first array of conductors and said electroluminescent layer, said pillars being located at the points where said second array of conductors cross over said first array of conductors; each of said pillars being composed of a mixture consisting of silicon carbide, 60–65% polybisphenol type A epoxy resin having a viscosity of between 50–100 poises and 10–13% polyamide catalyst, said silicon carbide being concentrated at the center of said pillar.

10. An electroluminescent device comprising a first array of parallel separated electrical conductors extending along a first direction; a second array of parallel separated electrical conductors extending along a second direction, said second array of conductors crossing over said first array of conductors, a plane passed through said first array of parallel conductors being substantially parallel to a plane passed through said second array of parallel conductors; an electroluminescent layer interposed between said arrays; a plurality of pillars interposed between said first array of conductors and said electroluminescent layer, said pillars being located at the points where said second array of conductors cross over said first array of conductors; each of said pillars being comprised of a symmetrically non-linear resistive core circumferentially surrounded by an electrically insulating coating, and an insulating plastic layer affixed to said electroluminescent layer in the space surrounding said pillars, the height of said plastic layer being substantially equal to the height of said pillars.

11. The electroluminescent device defined by claim 10 wherein said plastic layer is composed of vinyl chloride acetate.

References Cited by the Examiner

UNITED STATES PATENTS

| | | | |
|---|---|---|---|
| 2,917,667 | 12/59 | Sack | 315—169 |
| 2,918,396 | 12/59 | Hall | 148—1.5 |
| 2,998,546 | 7/61 | Kuntz et al. | 315—169 |

GEORGE N. WESTBY, *Primary Examiner.*